United States Patent

Godwin et al.

[15] 3,667,015

[45] May 30, 1972

[54] ALTERNATING CURRENT MOTOR STARTING APPARATUS AND METHOD

[72] Inventors: Gurney L. Godwin, Pittsburgh; Lee A. Kilgore, Export, both of Pa.

[73] Assignee: Westinghouse Electric Corporation, Pittsburgh, Pa.

[22] Filed: June 18, 1970

[21] Appl. No.: 47,297

[52] U.S. Cl. .............................................. 318/171, 318/415
[51] Int. Cl. ........................................................ H02p 1/52
[58] Field of Search ............................... 318/171, 231, 415

[56] References Cited

UNITED STATES PATENTS 2,431,486  11/1947  Keller et al. ........................... 318/171
2,137,989  11/1938  Rossman ................................ 318/171

Primary Examiner—Gene Z. Rubinson
Attorney—A. T. Stratton, Gordon H. Telfer and F. P. Lyle

[57] ABSTRACT

A starting set including an induction machine and a synchronous machine is brought up to speed before connection to the main motor that is to be started. The induction machine may have a number of poles that is a fraction, such as one-half, of the poles of the synchronous machine of the starting set so that the secondary of the wound rotor motor produces a voltage at that fraction of the line frequency at full speed. Alternatively, the induction machine and the synchronous machine of the starting set may have the same or nearly the same number of poles but the machines are concatenated to provide the desired frequency change. After the starting set is up to full speed, the main motor is connected to the secondary of the wound rotor motor and accelerates to a speed near synchronism with the secondary supply. If the main motor is a synchronous machine it is then synchronized with the secondary supply by applying field excitation. Means are then provided to increase the load on the synchronous machine of the starting set. The starting set is then disconnected from the power line so that it will begin to decelerate and, when brought to as low a speed as possible, the main motor will be running at nearly line synchronous speed and can be synchronized with the line.

6 Claims, 5 Drawing Figures

Patented May 30, 1972

ALTERNATING CURRENT MOTOR STARTING APPARATUS AND METHOD

BACKGROUND OF THE INVENTION

1. Field of the Invention

This invention relates to starting means and methods for AC machines.

2. Description of the Prior Art

Sufficient power is often not available to start large motors directly from a power line without excessive system disturbance and thus some auxiliary device is necessary to bring the motor up to speed. In designing starting means for large machines there are important considerations on the size, cost and power requirements of any auxiliary devices required.

Large water wheel generators of approximately 100,000 horsepower, for example, are presently used in hydroelectric generation plants. It is sometimes desirable to use the generators as motors during off peak periods to pump water back into a reservoir for subsequent use in power generation. Such large machines cannot be directly connected to the power line because of the likelihood of producing undesirable system overloads. Therefore a starting means must be provided to bring the machine up to speed before it is connected directly to the power line.

Standard practice in the past has been to use a starting set including an induction motor, such as a wound rotor motor, and a synchronous generator on the same shaft and capable of supplying line frequency, or nearly line frequency, at full speed. The procedure is merely to connect, electrically, the main motor to the starting generator and then start the wound rotor motor. The frequency starts at zero and increases with the speed of the set. When the wound rotor motor has been brought up to speed, the main motor can be connected to the line and the starting set can be shut down.

While such a starting scheme has been generally adequate it is desirable to minimize the rating and size of the machines of the starting set and it is also desirable not to have to exercise the care required in order to avoid the negative damping characteristics of synchronous machines operated at low frequency.

SUMMARY OF THE INVENTION

In accordance with this invention, the arrangement of starting apparatus and the starting sequence are changed from that which is employed in the standard procedure described above. The changes in starting apparatus and sequence permit reduction in machine rating and size that provide substantial economies.

In accordance with this invention the starting set includes an induction machine, such as a wound rotor motor, and a synchronous machine. The induction machine may have fewer poles than the synchronous machine so that its secondary at full speed produces a voltage at a corresponding fraction of the line frequency. The starting set is brought up to speed before connection to the main motor. This may be by using either one or both of the synchronous machine and the induction machine for starting. The main drive motor is then connected to the secondary of the induction machine which produces voltage at a fraction of line frequency in accordance with the ratio of the difference of the number of poles of the synchronous motor and the induction machine to those of the synchronous machine of the starting set. For example, the synchronous machine in the starting set may be an eight pole synchronous machine while the induction machine may be a four pole machine so that a frequency change of one-half results. The main motor thus accelerates to half-speed using its damper windings for starting and is synchronized to the secondary supply. The starting set is then loaded increasingly so that it is decelerated when the speed set is disconnected from the line. As the starting set decelerates, the speed of the main motor will build up to near its full rated speed at which point it can be synchronized with the line voltage.

Alternatively, the two machines of the starting set may be concatenated, that is, they may be cascaded by having the stator winding of the synchronous machine connected to the secondary of the induction machine, to provide the desired frequency change. When the machines are concatenated the determining frequency ratio is the number of poles of the synchronous motor divided by the total number of poles of both machines.

In accordance with this invention the rating and size of the starting set can be reduced to about one-half of the set used in previously conventional practice. Also, the normal damper windings of the synchronous machine on the starting set provides ample positive damping so that the care previously required to prevent negative damping is unnecessary.

DESCRIPTION OF PREFERRED EMBODIMENTS

Figure 1:
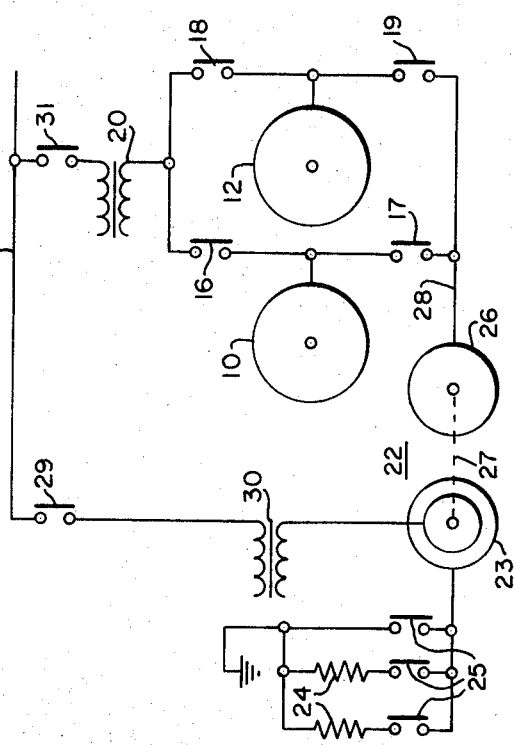
FIG. 1 is a schematic circuit diagram of a synchronous motor and starting means therefor in accordance with the prior art.

By way of further background, reference is made to FIG. 1 which shows starting means in accordance with the prior art. A number of main motors 10 and 12 (typically synchronous generators intended to be operated as motors) are connected to a power line 14 through various circuit breaker means 16, 18 and 31, and a transformer 20 as would ordinarily be employed. The main motors are also connected with a starting set 22 through individual circuit breaker means 17 and 19.

The starting set 22 comprises an induction motor 23, with associated secondary starting resistors 24 and circuit breaker means 25 connected to its secondary or its stator for the selective connection of the resistors 24 to the motor 23. The induction motor 23 is typically a wound rotor motor because it permits connections to be made to both primary and secondary windings. As shown in this example, the primary winding (to which supply line 14 is coupled) is on the rotor and the secondary is on the stators. However, this is not necessary and the connections may be reversed.

The starting set 22 also includes a synchronous generator 26 capable of supplying line frequency or nearly line frequency power at full speed. The synchronous machine 26 is on the same shaft 27 as the rotor of motor 23. The stator of machine 26 is connected by line 28 and breaker means 17 and 19 to the main motors 10 and 12. A main motor 10 or 12 is started by connecting it to the starting generator 26 and then starting the motor 23 by closing breaker means 29 to power line 14. Ordinarily, a transformer 30 is between power line 14 and motor 23.

It is contemplated in this discussion of the prior standard practice, as well as following discussion of the present invention, that individual ones of the main synchronous motors 10 and 12 are separately started. The single line schematics used for illustration omit conventional details of dynamoelectric machine practice such as those elements necessary to complete a three phase system as would ordinarily be used. Also, brushes and slip rings for connection with the rotor of the motor 23, and field excitation means and other elements are not detailed.

As the starting set 22 begins, the frequency starts at zero and increases with the speed of the set. When the starting set 22 has been brought up to speed the main motor 10 can be connected with the line 14 by closing breaker means 31 and the starting set 22 can be shut down.

In such schemes as that shown in FIG. 1, care must be taken during the start to avoid instability due to negative damping characteristics of the main machines operated at low frequency. No general solutions for this instability exist so careful engineering design is required in each application. Also, it has now been found that the machines 23 and 26 are larger, and thus more expensive than need be the case. Eight poles for the induction machine 23 and 10 poles for synchronous machine 26 are typical of machines employed in practice.

Figure 2:
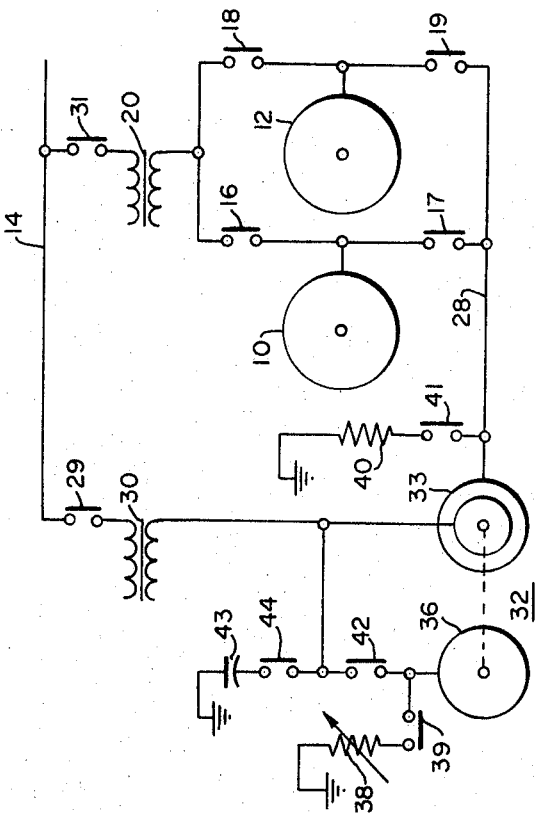
FIG. 2 is a schematic circuit diagram of a synchronous motor and starting means in accordance with one embodiment of the present invention.

In the exemplary embodiment of the present invention shown in FIG. 2, the main motors 10 and 12 are illustrated with a starting set 32 that also includes an induction machine 33 and a synchronous machine 36 but with the secondary (stator) winding of the motor 33 connected to the main motors by line 28 and breaker means 17 and 19. The synchronous machine 36 has appropriate loading means such as a rheostat 38 with an associated breaker means 39 and the wound rotor motor 33 will have suitable starting resistors 40 and associated breaker means 41. The starting set 32 may be brought up to speed using the synchronous machine 36 alone. However, if starting time or heating is a design limit both the wound rotor and synchronous machines 33 and 36 can be used.

Initially, the main motors 10 and 12 are not connected to the starting set 32. Only when the starting set 32 is up to speed is a main drive motor then connected to the secondary of motor 33 which produces a fraction of line frequency at full speed depending on the number of poles of the synchronous machine 36 and motor 33 of the starting set 32. As an example, there can be eight poles in the synchronous machine 36 and four poles in the motor 33 resulting in a half line frequency at full speed on the secondary of motor 33. The controlling factor determining the frequency is the ratio of the difference in the numbers of poles of the two machines to the number of poles of the synchronous machine. The main motor thus accelerates to half-speed using its damper windings for starting and can be synchronized to the secondary supply.

At this point the rheostat 38 is set to absorb more power than is being produced by the synchronous machine 36 and then a breaker 42 is opened to disconnect the starting set 32 from the line so that the speed set will begin to decelerate. The rate of deceleration is determined by adjusting the synchronous field current and the value of the braking resistor 38.

When the speed set 32 has been brought to as low a speed as possible by applying maximum field current and shorting the stator winding of machine 36, the main motor 10 will be running at nearly synchronous speed and can be synchronized with the line. The capacitor 43 shown connected to machine 36 through breaker means 42 and 44 can be provided to correct for most of the reactive KVA during starting, if desired.

The synchronous speed of the 4 pole induction machine 33 coupled to the 60 cycle line is 1,800 revolutions per minute but this is effectively offset, initially, by the 900 revolution per minute shaft speed produced by the synchronous machine 36. The net rotating field is therefor at a frequency of 900 revolutions per minute producing a 30 cycle voltage on the secondary of the four pole machine (4 × 900/120). When the synchronous machine 36 is braked to a standstill, the induction machine 33 acts as a stationary transformer with 60 cycle power on its primary.

It is convenient that the ratio of poles of the wound rotor motor 33 to that of the synchronous machine 36 be about one-half although this is not essential. It does permit the main motors to start at some fraction of speed on the secondary of motor 33. In general ratios of from about 0.4 to 0.6 would be preferred in the practice of this invention. In the prior art scheme a ratio of about 0.8 would be typical, requiring larger machines, more cost and higher ratings.

Figure 3:
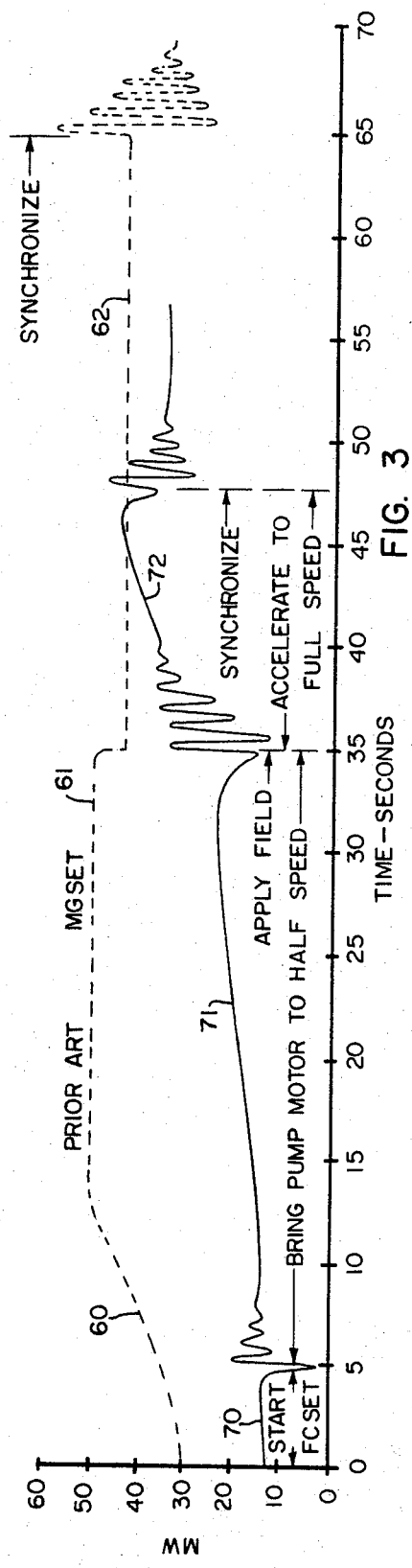
FIG. 3 is a set of curves illustrative of the comparative operation of systems as shown in FIGS. 1 and 2.

In FIG. 3, curves are presented showing calculated power demand versus time for starting schemes in accordance with the prior art and in accordance with this invention. The upper curve is for a starting scheme in accordance with the prior art such as that shown in FIG. 1. It shows a gradual build up in power from about 30 to near 50 MW occurs over the first portion 60 of the starting sequence. During this period the frequency starts at zero and increases with the speed of the set. There may be an initial transient oscillation in the power demand that is not illustrated here. Continuing level power requirements over curve portion 61 occur until a point after 35 seconds when the field excitation is applied to the main motor and speed increases over curve portion 62 with constant power demand to the point at which the speed is sufficiently close to the line frequency that synchronism can be attained.

In the lower curve of FIG. 3, with a frequency changer (F.C.) scheme in accordance with this invention, such as that shown in FIG. 2, there is an initial period 70 in which the starting set is energized, after which, during curve portion 71, the main motor is connected to the CW secondary with build-up in speed to half-speed, for the example illustrated in which the ratio of poles is 0.5, then the field is applied and the machine accelerates to full speed during period 72 at which synchronism occurs. It is shown that in this calculated example there is substantial saving over the starting cycle in the power requirements of the proposed starting scheme in accordance with this invention compared with that of prior practice. Similar calculations can be made to show that there are also substantial savings in reactive power (MVAR) demand.

Figure 4:
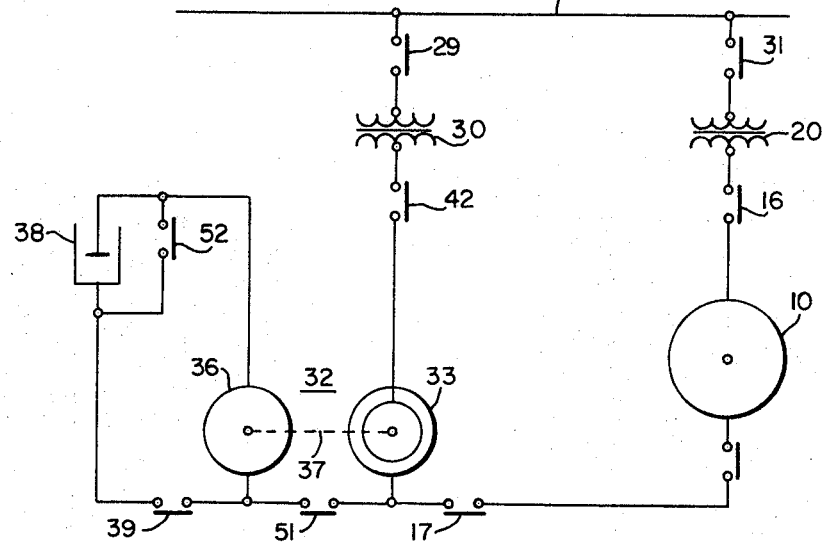
FIG. 4 is a schematic circuit diagram of an alternate embodiment of the present invention.

FIG. 4 illustrates an alternative form of the present invention wherein various elements are designated by reference numerals that are the same as for corresponding elements of FIG. 2. The starting set 32 comprises a wound rotor motor 33 and a synchronous generator 36 and the sequence of operations during the starting cycle is the same as was described in connection with FIG. 2. However, the frequency change in the example of FIG. 4 does not result from a difference in the number of poles of the two machines in the starting set but rather from the fact that two machines, both six poles, for example, are used with their windings cascaded. The machines are mechanically connected to the same shaft 37 and the secondary of the motor 33 is connected to the stator winding of the synchronous generator through line 50 and circuit breaker means 51. The combination of the two machines will operate at a speed equivalent to the sum of the two pole numbers for which the two machines are wound. Since the motor represents half that number of poles, its secondary provides a frequency change of one-half similar to the operation of the embodiment of FIG. 2. That is, with the concatenated connection it is the ratio of the number of poles of the synchronous machine to that of the total of the two machines that represents the frequency change.

Going through the sequence of operations in starting, breakers 42 and 51 are closed to accelerate the starting set to a speed equivalent to the sum of the poles of the motor 33 and salient pole machine 36. The flux in the induction machine is revolving at 60 cycle speed, but the rotor is turning at 30 cycle speed. Because of this, half of the wound rotor machine's input goes to the generator 36 through the common shaft 37 and half of its input goes to its secondary winding. By closing circuit breaker 17, the full power is available to accelerate the main pump motor 10 to half-speed. In this example the main motor 10 is an 80,000 horse power synchronous motor. The power bus 14 supplies 230 KV that is transformed down to 14.4 KV for the main motor 10 and to 6.9 KV for the starting set 32.

In the next step of the starting sequence, the synchronous machine 36 is disconnected from the motor 33 by opening breaker 51. The generator 36 is then connected to a braking rheostat 38 by closing circuit breaker 39. This brings the starting set down in speed and, hence, increases the frequency output of the induction machine 33 as explained above in connection with FIG. 2. By reducing the resistance of the braking resistor 38 and finally short circuiting the generator with contactor 52, maximum frequency and voltage output are obtained from the motor 33 feeding the pump motor 10. At this point in the starting cycle the starting sets frequency output is sufficiently close to 60 cycle speed so that the motor 10 can be easily synchronized with the line 14 by closing its running breaker 16 and opening breaker 17.

If another 80,000 horsepower pump motor is to be started at once, the starting set is brought again to the 30 cycle speed by merely opening breaker 39 and closing breaker 51. Breaker 42 can be kept closed until all the motors that are to be started are started.

The proposed scheme of FIG. 4 offers advantages in that it uses machinery effectively. The torque of the starting set 32 times the 60 cycle speed of the flux matches the output to the main motor 10 whereas the actual maximum running speed is just half for the 30 cycle output.

The various embodiments of the invention employing the frequency change concept for starting a large synchronous motor provide lower peripheral speed and mechanical stress and require less volume of electrical machinery. Speed matching is not required for synchronization. Synchronizing is simpler and much faster resulting in less duty and less restrictions on the set transformer 30 and associated breakers. This permits lower rating of breakers which have low maintenance even with frequent operation. A liquid rheostat 38 is shown but resistors can be used and mounted under the F.C. 32 and cooled by its ventilation system, thus avoiding the maintenance of electrolyte in a liquid rheostat where that is used for the braking resistor 38. Contactors suitable for use up to 1,000,000 mechanical operations are available. In accordance with this invention, starting cycles of no more than about 4 minutes are usually provided for and increased torque is available for future pump motor starting needs.

Figure 5:
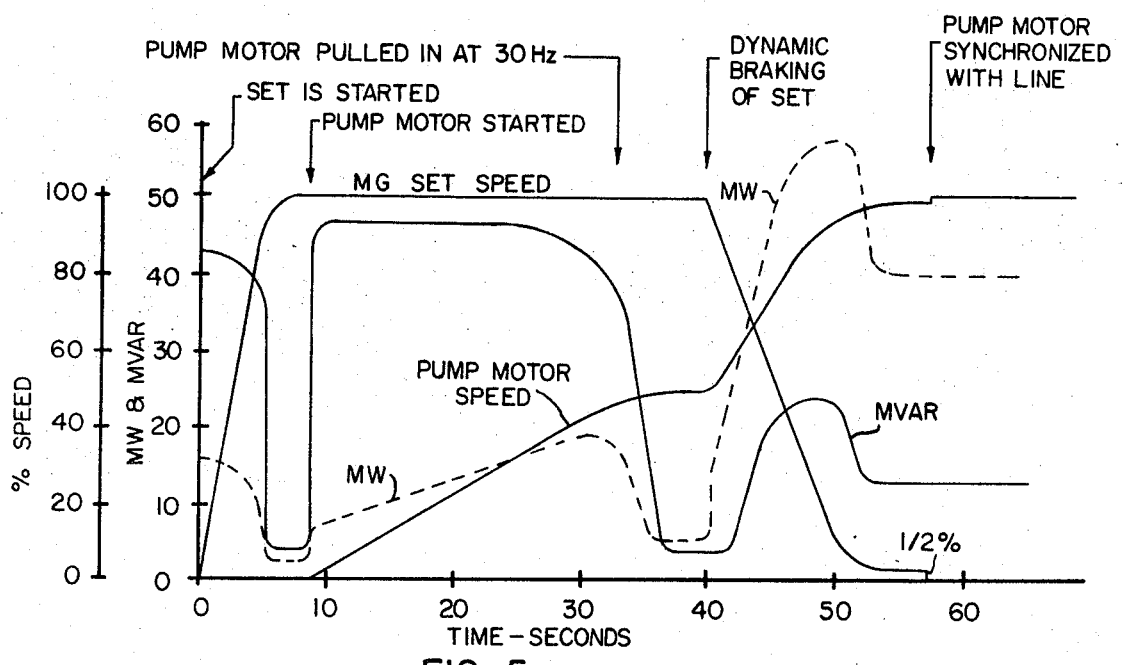
FIG. 5 is a set of curves illustrative of the operation of systems as shown in FIG. 4.

FIG. 5 illustrates a set of curves for the operation of a system as illustrated in FIG. 4. The various curves, as labeled, show power demand (both MW and MVAR) and speed (both for the starting set and the main pump motor) in relation to elapsed time in the starting sequence for a six pole to six pole starting set at 600 RPM.

We claim as our invention:

1. Dynamoelectric machine starting apparatus comprising:
a synchronous dynamoelectric machine;
an induction dynamoelectric machine having a commonly connected shaft with said synchronous dynamoelectric machine and comprising therewith a starting set;
means for electrically connecting the secondary of said induction machine with a main motor to be started when said starting set has been brought to substantially full speed by connection to an AC voltage supply;
means for effecting deceleration of said starting set; and
means to disconnect said synchronous machine of said starting set from said A.C. voltage supply to decelerate said starting set while said induction machine is connected to said supply and to accelerate said main motor.

2. The subject matter of claim 1 wherein said induction motor is a wound rotor motor having a number of poles in a ratio with the number of poles of said synchronous dynamoelectric machine that is in the range of from about 0.4 to about 0.6.

3. The subject matter of claim 1 wherein:
said induction motor has the same number of poles as said synchronous machine and further comprising means for connecting the secondary of said induction motor to the stator of said synchronous machine and for interrupting the connection therebetween to disconnect said synchronous machine from said A.C. voltage supply.

4. A method of starting an A.C. motor comprising the steps of:
starting a starting set that comprises a synchronous machine and an induction machine mechanically connected on a shaft with means to develop an alternating voltage at a fraction of line voltage frequency on the secondary winding of said induction machine;
connecting a main motor to be started to the secondary of said induction machine only after said voltage at a fraction of line voltage frequency has been developed and accelerating said main motor to a speed that is a fraction of full speed corresponding with the fraction of line voltage frequency on said secondary;
decelerating said starting set while maintaining only said primary of said induction machine connected to said line voltage supply; and
connecting said main motor with said line voltage supply after said starting set is near stand-still.

5. The subject matter of claim 4 wherein:
the secondary winding of said induction machine is maintained without connection with the stator of said synchronous machine.

6. The subject matter of claim 4 wherein:
the secondary of said induction machine is connected to the stator of said synchronous machine during the starting of said starting set and is disconnected therefrom after the starting set has reached full speed and before decelerating said starting set.

* * * * *